(12) United States Patent
Khan

(10) Patent No.: US 8,909,717 B2
(45) Date of Patent: Dec. 9, 2014

(54) PRESENTING INSTANT MESSAGING CONTACTS LISTED BY PROXIMITY TO SET LOCATION

(75) Inventor: Tabarak Khan, Hoffman Estates, IL (US)

(73) Assignee: Blackberry Limited, Waterloo (CA)

( * ) Notice: Subject to any disclaimer, the term of this patent is extended or adjusted under 35 U.S.C. 154(b) by 676 days.

(21) Appl. No.: 13/111,761

(22) Filed: May 19, 2011

(65) Prior Publication Data

US 2012/0296984 A1    Nov. 22, 2012

(51) Int. Cl.
G06F 15/16    (2006.01)
H04L 12/58    (2006.01)

(52) U.S. Cl.
CPC ............... *H04L 51/04* (2013.01); *H04L 51/20* (2013.01); *H04L 51/28* (2013.01)
USPC ........................................................ 709/206

(58) Field of Classification Search
CPC ............................. G06F 15/16; H04W 4/021
USPC .................. 709/206, 217–219, 228; 455/563
See application file for complete search history.

(56) References Cited

U.S. PATENT DOCUMENTS

| | | |
|---|---|---|
| 2004/0203923 A1 | 10/2004 | Mullen |
| 2004/0260762 A1 | 12/2004 | Fish |
| 2006/0200490 A1 | 9/2006 | Abbiss |
| 2008/0096519 A1 | 4/2008 | Miegel |
| 2008/0134088 A1 | 6/2008 | Tse et al. |
| 2008/0177758 A1 | 7/2008 | Eldering |
| 2009/0191898 A1* | 7/2009 | Lewis et al. ............... 455/456.3 |
| 2009/0300010 A1 | 12/2009 | Ratnakar |
| 2010/0004005 A1 | 1/2010 | Pereira |

FOREIGN PATENT DOCUMENTS

| | | |
|---|---|---|
| WO | 0163315 A2 | 8/2001 |
| WO | 2004059996 A1 | 7/2004 |

OTHER PUBLICATIONS

Opera Mail Tutorial—Using filters to sort messages; http://www.opera.com/browser/tutorials/mail/sort/. Retrieved on May 2, 2012.
Sort messages alphabetically—http://office.microsoft.com/en-us/outlook-help/sort-messages-alphabetically-HA001166765.aspx. Retrieved on May 2, 2012.
Pairwise distances; Geospatial Analysis—a comprehensive guide. 3rd edition © 2006-2011 de Smith, Goodchild, Longley. http://www.spatialanalysisonline.com/output/html/Pairwisedistances.html. p. 1.
Thomas L. SaatySatty—Relative Measurement and Its Generalization in Decision Making Why Pairwise Comparisons are Central in Mathematics for the Measurement of Intangible Factors the Analytic Hierarchy/Network Process. vol. 102 (2), 2008, pp. 251-318. pp. 1-68.

(Continued)

*Primary Examiner* — Thai Nguyen
(74) *Attorney, Agent, or Firm* — Novak Druce Connolly Bove + Quigg LLP

(57) ABSTRACT

An electronic device having instant messaging (IM) capabilities within one or networks. The technology provides means and methods whereby an electronic device is enabled to evaluate and present information regarding available IM contacts based on geographic criteria. Location information from devices which are associated with instant messaging contacts of a first electronic device are received. IM contacts contact can be display based on geographic location, including proximity to one or more set locations. The technology can be customized dynamically on a per device basis.

16 Claims, 10 Drawing Sheets

(56) References Cited

OTHER PUBLICATIONS

Kuo-Chung Tai and Yu Lei. A test Generation Strategy for Pairwise Testing. IEEE Transactions on Software Engineering, vol. 28, No. 1 Jan. 2002.

Extended European Search Report dated Aug. 8, 2011. In corresponding application No. 11166747.3.

Office Action mailed Nov. 25, 2013, in corresponding Canadian patent application No. 2,776,777.

* cited by examiner

PRESENTING INSTANT MESSAGING CONTACTS LISTED BY PROXIMITY TO SET LOCATION

FIELD OF THE TECHNOLOGY

The present disclosure relates generally electronic devices having instant messaging (IM) capabilities. More specifically, enabling implementations relate to sorting IM contacts based on geographic location. The technology provides means and methods whereby an electronic device is enabled to evaluate and present information regarding available IM contacts based on geographic criteria. In at least one implementation, the technology provides for receiving location information from devices which are associated with instant messaging contacts of a first electronic device. The technology can be customized dynamically on a per device basis. In at least one implementation the technology presents proximity information regarding at least one electronic device and at least one set location. In at least one implementation the technology presents proximity information regarding at least one electronic device and at least one set location where the set location is the location of a second electronic device.

DETAILED DESCRIPTION

Within the technology, instant messaging (IM) is a collection of technologies used for real-time communication between two or more participants over the Internet, or other types of networks. Instant messaging (IM) is a form of real-time direct communication between two or more people using personal computers or other devices, along with shared software clients. The user's text is conveyed over a network, such as the Internet.

In some contexts or implementations, IM may be considered under the umbrella term online chat, as it includes the capability to provide a real-time text-based networked communication system based on device client applications and network services that facilitate communication connections between specified known users. Known users, or simply contacts or one or more entries from a contact list, comprise, for example, a Buddy List, a Friend List and a Contact List. IM can comprise web-based applications that allow communication between users in a mufti-user environment.

In at least one implementation, the technology can sort contacts within a list by geographic criteria including contacts not available for instant messaging and provide other options for contacting contacts, such as via telephone or email.

In at least one implementation of the technology, one or more web browsers can serve as intermediaries between IM contacts to enable IM correspondence.

Location of one or more IM contacts can be determined by use of one or more Global Positioning Systems (GPS), if a contact is configured to have a GPS receiver. Global Positioning Systems are space-based global navigation satellite systems (GNSS) that provide location and time information in all weather and at all times anywhere on or near Earth when and where there is an unobstructed line of sight to multiple GPS satellites.

In some implementations, location of a contact can be determined based upon the contact's internet protocol address (IP address). An IP address is a numerical label assigned to each device participating in a network that uses the Internet Protocol for communication. An IP address serves multiple functions, including such functions as host or network interface identification and location addressing. The IP addresses may be either public or private. That is, they can reside within a public network, such as the internet, or within private networks.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
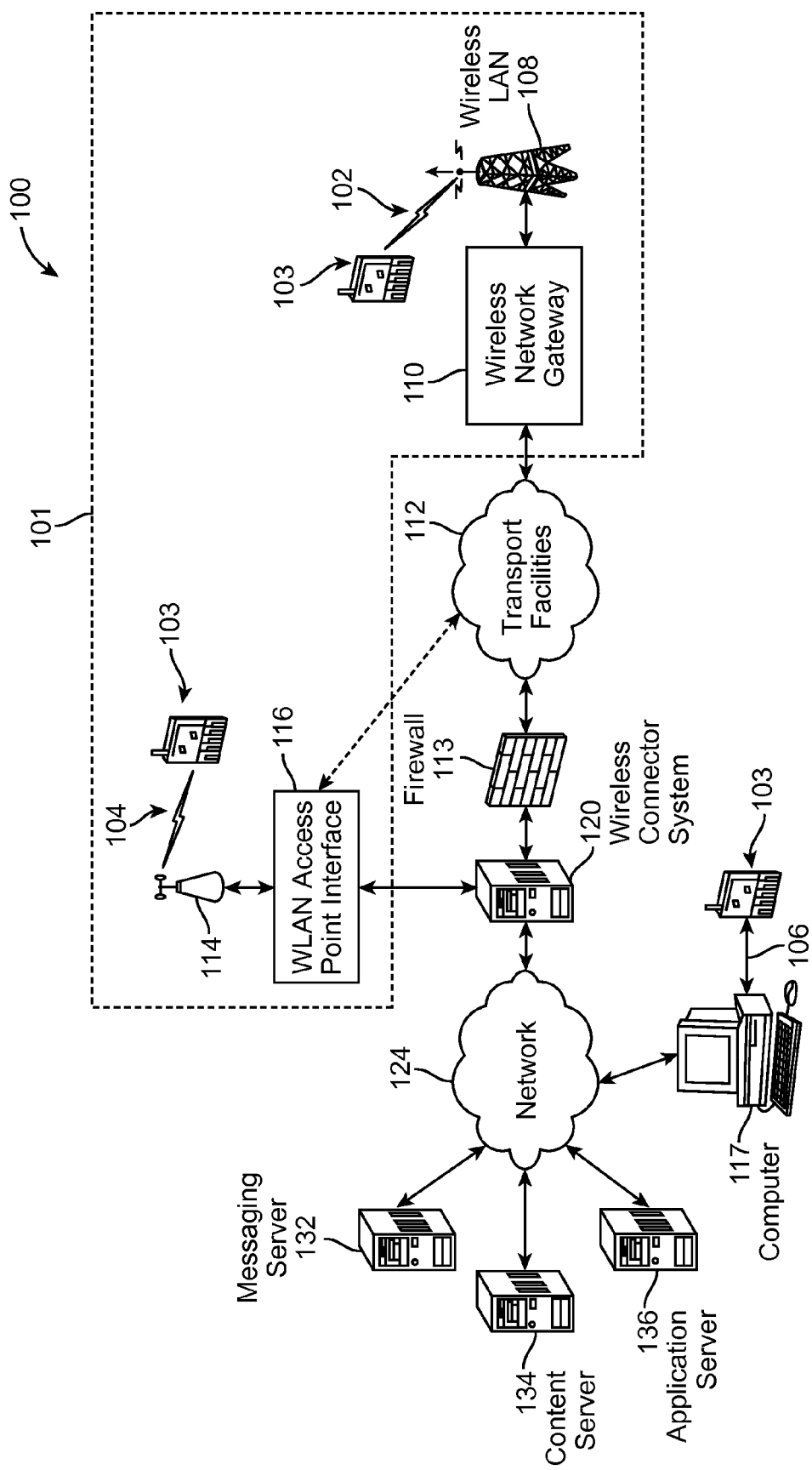
FIG. 1 illustrates a system including an electronic device to which example implementations of the technology can be applied.

In order to facilitate an understanding of environments in which example implementations described herein can operate, reference is made to FIG. 1, which shows, in block diagram form, a communication system 100 in which implementations of the technology can be applied. The communication system 100 may comprise a number of electronic devices 103 and computers 117 and other devices that may be connected to the remainder of system 100 in any of several different ways. Accordingly, several instances of electronic devices 103 are depicted in FIG. 1 employing different example ways of connecting to system 100. Electronic devices include, but are not limited to, communication devices, computers, laptop computers, personal computers, handheld electronic devices, portable communications devices, mobile communications devices and the like.

These figures are exemplary only, and modifications may be necessary to make the electronic device, e.g., 103, 117 operable in particular network environments. While in the illustrated implementations, the communication devices, e.g., 103 may comprise smart phones, in other implementations, the communication devices may comprise personal digital assistants (PDA), tablet computers, laptop computers, desktop computers, servers, or other communication devices capable of sending and receiving electronic messages. Electronic message includes, but is not limited to, instant messages and email messages.

Electronic devices 103 are connected to a wireless network 101 that may comprise one or more of a Wireless Wide Area Network (WWAN) 102 and a Wireless Local Area Network (WLAN) 104 or other suitable network arrangements. In some implementations, the electronic devices 103 are configured to communicate over both the WWAN 102 and WLAN 104, and to roam between these networks. In some implementations, the wireless network 101 may comprise multiple WWANs 102 and WLANs 104. In some implementations, the electronic devices 103 are configured to communicate over the internet.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the electronic devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the electronic devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet), and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the electronic devices 103 and other devices (not shown) connected, directly or indirectly, to the WWAN 102. Accordingly, communications sent via the electronic devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the electronic devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed electronic devices 103. The wireless connector system 120 also provides administrative control and management capabilities over users and electronic devices 103 that might connect to the wireless connector system 120.

The wireless connector system 120 allows the electronic devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to electronic devices 103, and intranet file services.

The wireless connector system 120 typically provides a secure exchange of data (e.g., email messages, personal information manager (PIM) data, and IM data) with the electronic devices 103. In some implementations, communications between the wireless connector system 120 and the electronic devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the electronic device 103, and can typically be regenerated by the user on electronic devices 103. Data sent to the electronic devices 103 is encrypted by the wireless connector system 120 using the private encryption key retrieved from the user's mailbox. The encrypted data, when received on the electronic devices 103, is decrypted using the private encryption key stored in memory. Similarly, data sent to the wireless connector system 120 from the electronic devices 103 is encrypted using the private encryption key stored in the memory of the electronic device 103. The encrypted data, when received on the wireless connector system 120, is decrypted using the private encryption key retrieved from the user's mailbox.

The wireless network gateway 110 is adapted to send data packets received from the electronic device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination electronic device 103. The AP interfaces 116 of the WLAN 104 provide similar sending functions between the electronic device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. An electronic device 103 may alternatively connect to the wireless connector system 120 using a computer 117, such as desktop or notebook computer, via the network 124. A link 106 may be provided for exchanging information between the electronic device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the electronic device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system 100 is provided for the purpose of illustration only, and that the above-described communication system comprises one possible communication network configuration of a multitude of possible configurations for use with the electronic devices 103. Suitable variations of the communication system will be understood to a person of skill in the art and are intended to fall within the scope of the present disclosure.

Figure 2:
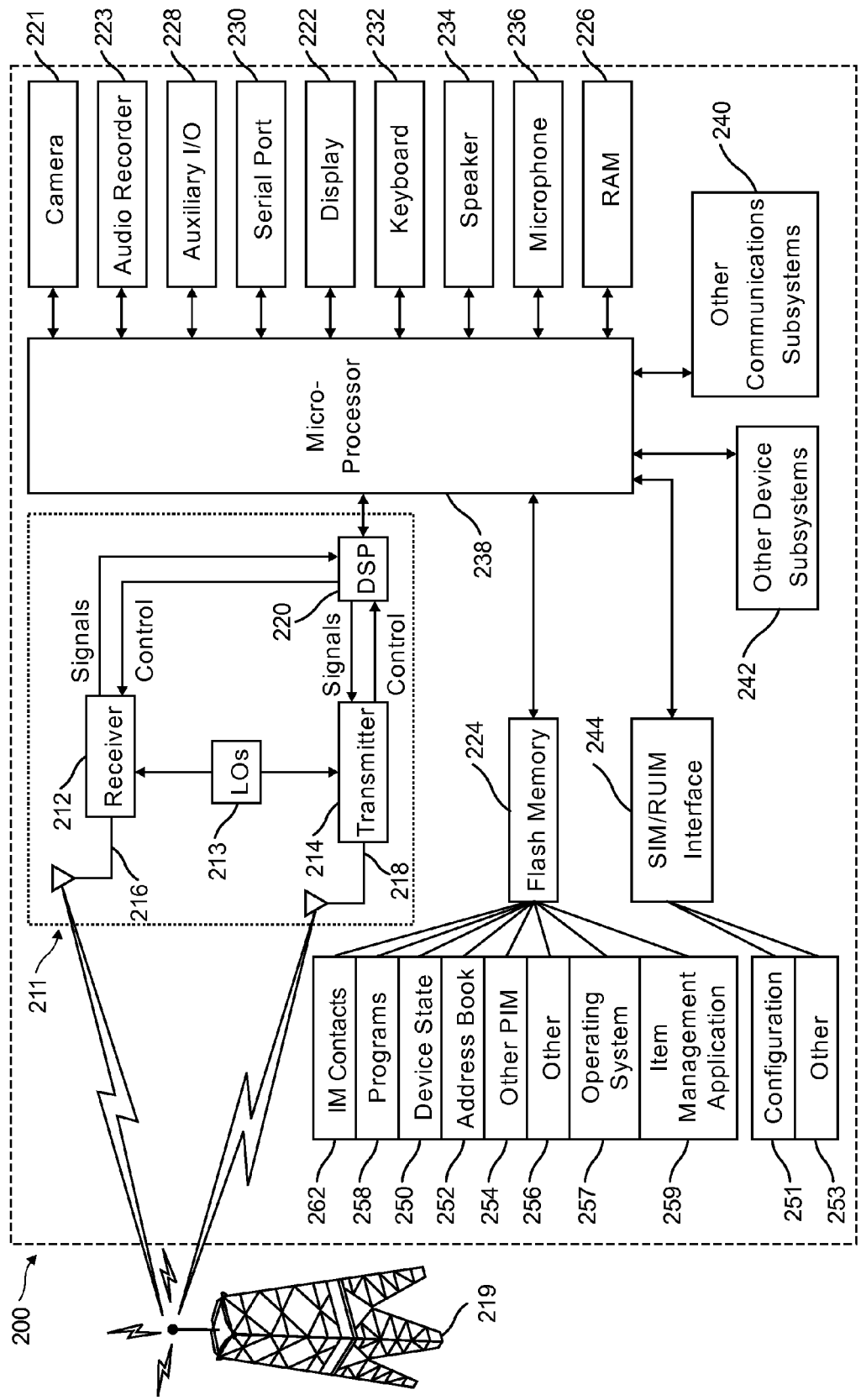
FIG. 2 illustrates a block diagram of an electronic device.

Within this disclosure the singular and plural of electronic device(s) will each be understood to include the other. Referring to FIG. 2, a block diagram of an electronic device, such as 200 and 103 and 117, in accordance with an exemplary implementation is illustrated. As shown, the device 200 includes a processor 238 that controls the operation of the communication device 200. A communication subsystem 211 performs communication transmission and reception with the wireless network 219. The microprocessor 238 further can be communicatively coupled with an auxiliary input/output (I/O) subsystem 228. In at least one implementation, the processor 238 can be communicatively coupled to a serial port (for example, a Universal Serial Bus port) 230 that can allow for communication with other devices or systems via the serial port 230. A display 222 can be communicatively coupled to processor 238 to allow for display of information to an operator of the communication device 200. When the communication device 200 is equipped with a keyboard 232, the keyboard can also be communicatively coupled with the processor 238. The communication device 200 can include a speaker 234, a microphone 236, random access memory (RAM) 226, and flash memory 224, all of which may be communicatively coupled to the processor 238. Other similar components may be provided on the communication device 200 as well and optionally communicatively coupled to the processor 238. Other communication subsystems 240 and other device subsystems 242 are generally indicated as being functionally connected with the processor 238 as well. An example of a communication subsystem 240 is a short range communication system such as BLUETOOTH® communication module or a WI-FI® communication module (a communication module in compliance with IEEE 802.11b) and associated circuits and components. Examples of other device subsystem 242 include sensor 200 of FIG. 2 and implementations of the present technology.

Additionally, the processor 238 is able to perform operating system functions and enables execution of programs on the communication device 200. In some implementations not all of the above components are included in the communication device 200.

The device 200 may be configured to send and receive messages. The device 200 includes a body that can, in some implementations, be configured to be held in one hand by an operator of the device 200 during text entry. A display 222 is included that is located on an electronic and upon which information is displayed to the operator, e.g., during text entry. The device 200 may also be configured to send and receive voice communications such as mobile telephone calls. The device 200 also can include a camera 221 to allow the device 300 to take electronic photographs that can be referred to as photos or pictures. Further, the device 300 can be configured to operate a web browser.

The auxiliary I/O subsystem 228 can take the form of a variety of different navigation tools (mufti-directional or single-directional) such as a trackball navigation tool, or a thumbwheel, a navigation pad, a joystick, touch-sensitive interface, or other I/O interface. These navigation tools may be located on the front surface of the communication device 200 or may be located on any exterior surface of the communication device 200. Other auxiliary I/O subsystems may include external display devices and externally connected keyboards (not shown). While the above examples have been provided in relation to the auxiliary I/O subsystem 228, other subsystems capable of providing input or receiving output from the communication device 200 are considered within the scope of the technology.

Furthermore, the electronic device 200 is equipped with components to enable operation of various programs, as shown in FIG. 2. In an exemplary implementation, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through predefined program interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators typically can interact directly with the operating system 257 through a user interface usually including the keyboard 232 and display 222. While in an exemplary implementation the operating system 257 is stored in flash memory 224, the operating system 257 in other implementations is stored in read-only memory (ROM) or similar storage element (not shown). The operating system 257, device programs 258, or parts thereof, may be loaded in RAM 226 or other volatile memory.

In some implementations, the flash memory 224 may contain programs 258 for execution on the device 200, including—but not limited to—an address book 252, a personal information manager (PIM) 254, a device state 250, and an instant messaging contact list 262. Furthermore, programs 258, such as social software, and other information 256 including data can be segregated upon storage in the flash memory 224 of the device 200.

When the communication device 200 is enabled for two-way communication within the wireless communication network 219, it can send and receive signals from a communication system or service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-T9), Ultra Mobile Broadband (UMB) networks, Worldwide Interoperability for Microwave Access (WiMAX), and other networks that can be used for data and voice, or just data or voice. For the systems listed above, the electronic device 200 may use a unique identifier to enable the communication device 200 to transmit and receive signals from the communication network 219. Other systems may not use such identifying information. GPRS, UMTS, and EDGE use a Subscriber Identity Module (SIM) in order to allow communication with the communication network 219. Likewise, most CDMA systems use a Removable User Identity Module (RUIM) in order to communicate with the CDMA network. The RUIM and SIM card can be used in multiple different communication devices 200. The communication device 200 can be configured to operate some features without a SIM/RUIM card, but it will not necessarily be able to communicate with the network 219. A SIM/RUIM interface 244 located within the communication device 200 allows for removal or insertion of a SIM/RUIM card (not shown). The SIM/RUIM card features memory and holds key configurations 251, and other information 253 such as identification and subscriber related information. With a properly enabled communication device 200, two-way communication between the communication device 200 and communication network 219 is possible.

The electronic device can communicate with a Global Positioning System via one or more networks 219.

If the communication device 200 is enabled as described above or the communication network 219 does not use such enablement, the two-way communication enabled communication device 200 is able to both transmit and receive information from the communication network 219. The transfer of communication can be from the communication device 200 or to the communication device 200. In order to communicate with the communication network 219, the device 200 can be equipped with an integral or internal antenna 218 for transmitting signals to the communication network 219. Likewise the device 200 can be equipped with another antenna 216 for receiving communication from the communication network 219. These antennae (216, 218) in another exemplary implementation are combined into a single antenna (not shown). As one skilled in the art would appreciate, the antenna or antennae (216, 218) in another implementation can be externally mounted on the communication device 200.

When equipped for two-way communication, the communication device 200 features a communication subsystem 211. This communication subsystem 211 can be configured to support the operational needs of the communication device 200. The subsystem 211 includes a transmitter 214 and receiver 212 including the associated antenna or antennae (216, 218) as described above, local oscillators (LOs) 213, and a processing module that in the presently described exemplary implementation is a digital signal processor (DSP) 220.

Communication by the communication device 200 with the wireless network 219 can be any type of communication that both the wireless network 219 and communication device 200 are enabled to transmit, receive and process. In general, these can be classified as voice or data, or both voice and data. Voice communication generally refers to communication in which signals for audible sounds are transmitted by the communication device 200 through the communication network 219. Data generally refers to all other types of communication that the communication device 200 is capable of performing within the constraints of the wireless network 219. Data communication includes, but is not limited to instant messaging and email.

Example device programs that can depend on such data include email, contacts and calendars. For each such program, synchronization with home-based versions of the program can be desirable for either or both of their long term and short term utility. As an example, emails are often time-sensitive, so substantially real time (or near-real time) synchronization may be desired. Contacts, on the other hand, can be usually updated less frequently without inconvenience. Therefore, the utility of the communication device 200 is enhanced when connectable within a communication system, and when connectable on a wireless basis in a network 219 in which voice, text messaging, instant messaging, and other data transfer are accommodated. Device 200 can include programs such as a web browser, a file browser, and client programs for interacting with server programs. Devices, e.g., 103, 117, 200, for use in the technology can be characterized by an identification number assigned to the device. In some implementations, identification numbers cannot be changed and are locked to each device. In some implementations, identification numbers can be associated with the IP address of a device.

Implementations of the technology can be realized as including programming on an electronic device, e.g., 103. In some implementations, programming for the technology is on the electronic device 103, while data used by the electronic device 103 is on the wireless connector system 120 or a network server such as content server 134, messaging server 132, or application server 136, or the Internet. In some implementations, programming for the technology can be realized on a remote server. Allocation of functionality among architectural elements can be a function of several factors including latency, processing resource availability and efficient usage, storage availability and efficient usage, and revenue opportunities.

Figure 3:
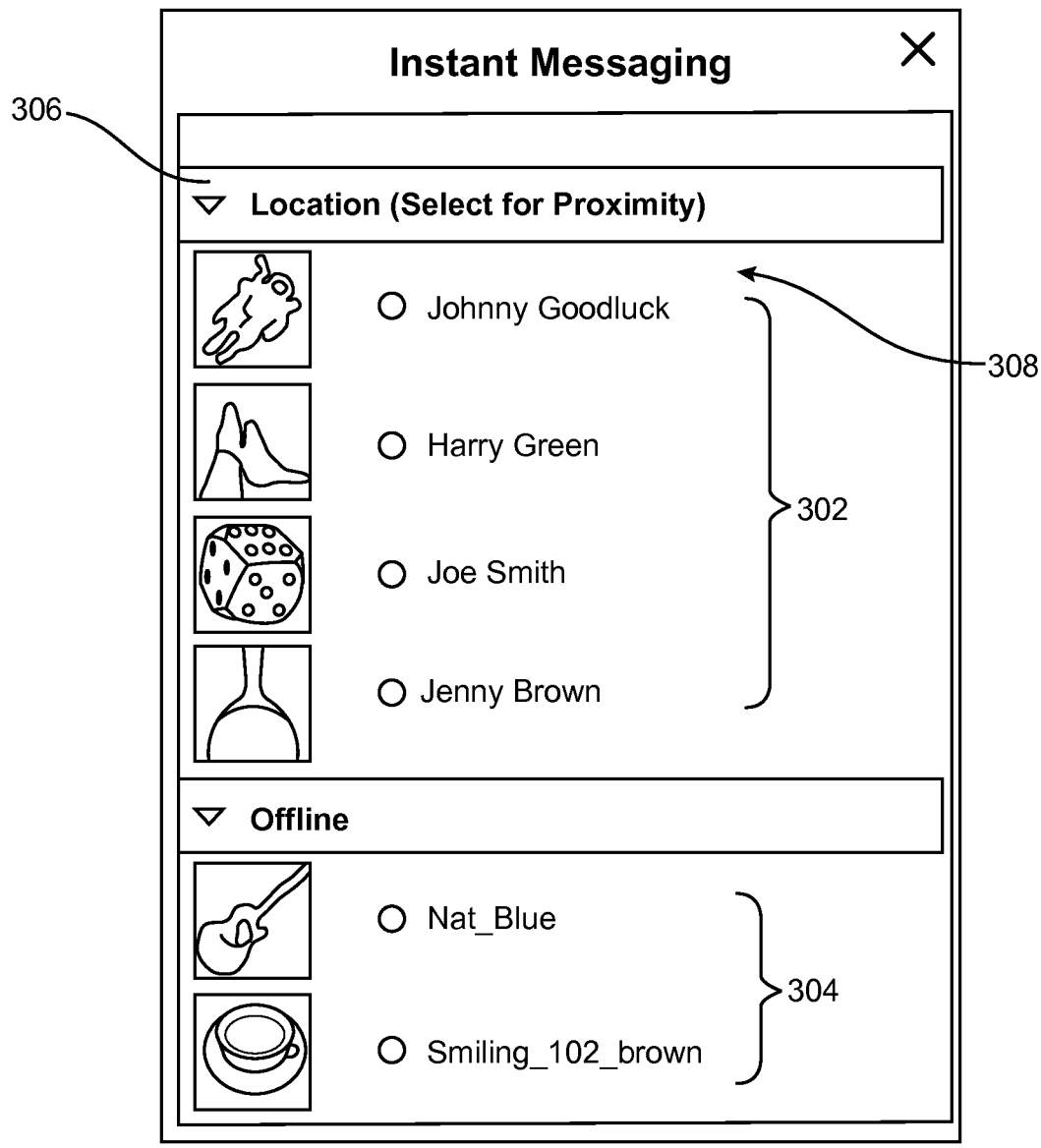
FIG. 3 illustrates an instant messaging window presented on a display of an electronic device.

FIG. 3 illustrates an instant messaging window 300 as can be presented on a display 222 of an electronic device 200. The instant messaging window 300 lists 308 available instant messaging contacts 302 from the instant messaging contacts corresponding to the device, e.g. 262. The window 300 also displays offline or unavailable instant messaging contacts 304. The window further displays an icon or letter box 306 prompting the entry or selection of a location.

Figure 4:
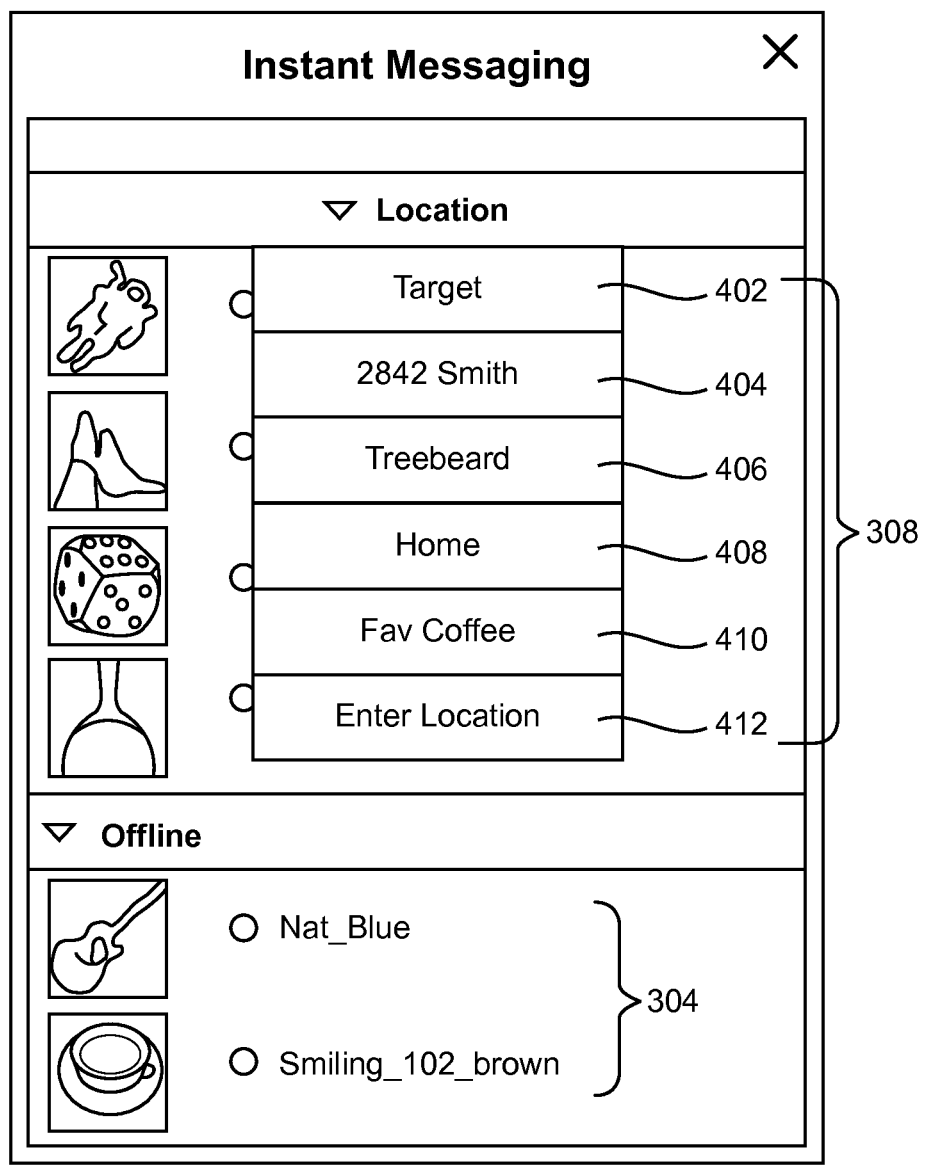
FIG. 4 illustrates a location entry instant messaging window presented on a display of an electronic device.

FIG. 4 illustrates a location selection window 400 as can be presented by a display 222. Possible locations 402-410 are listed 308 as selectable items. The first location listed, 402, represents multiple locations. Each of the multiple locations fall within a category. In the example illustrated in FIG. 4, the multiple locations represented by 402 are the addresses of all businesses which bear the name shown in 402. Locations 404-410 each correspond to a single address location. Some of the locations, e.g. 410, can be configured according to a user entry. So, for example, an address corresponding to a device 200 owner's favorite coffee seller 410 can have been previously entered into memory, e.g. 224, 226. The window 400 illustrated in FIG. 4, also includes a tab or letter box or icon 412 to enable the user of a device to enter a location. The location to be entered can be manually entered via a keyboard 232 or can be accessed from memory, e.g. 224, 226, or from external data sources to which a device 200 is connected via one or more networks, e.g., 124, 219. The location to be entered 412 can be the location corresponding to the location of an electronic device, whether it is the location of the device 200 itself or of other contacts, e.g., 302.

The technology requests location or address information from the devices 200, (e.g. 103, 117) associated with the available instant messaging contacts. The technology sorts the available or online instant message contacts by order of their proximity to the set location. In the case of multiple set locations, as where a user has requested multiple address locations corresponding to a particular business name, or address locations of businesses of a particular type, or address locations of businesses that sell a particular product or brand, the technology determines the pair-wise proximity between the set locations and the instant messaging contact locations. That is, the technology determines the distances between each of the locations and each of the available contacts. For a discussion of pair-wise comparison and testing, see Tai and Lee, *A Test Generation Strategy of Pairwise Testing*, IEEE Transactions on Software Engineering, Vol. 28, No. 1, January 2002, which is fully incorporated by reference herein. See also, Saaty, *Relative Measurement and Its Generalization in Decision Making etc.*, RACSAM, Vol. 202(2), pp. 251-318, 2008, which is fully incorporated by reference herein. The technology presents a list 308 of instant messaging contacts in order of their (pairwise) proximity to the multiple locations. For example, a user may wish to know which of his online messaging contacts is closest to a store which sells a particular product. The technology requests the locations of stores which sell the product and displays a list 308 of instant messaging contacts in the order of the contacts' closeness or proximity to any such store. The technology can be configured to display the distance from the contacts to the displayed store location, as well as display the address of the store. In at least one embodiment, the set location is determined by evaluating criteria including one of product availability, brand availability and item availability.

Figure 5:
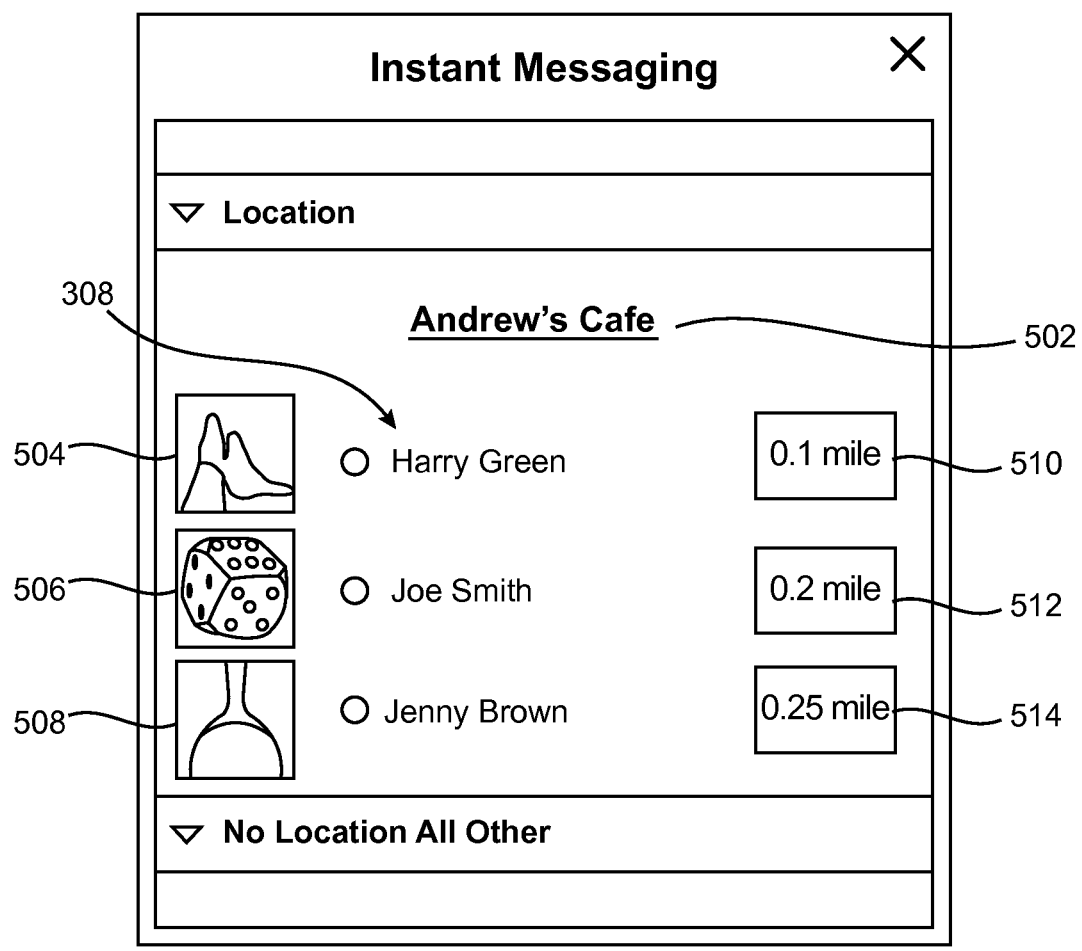
FIG. 5 illustrates an instant messaging window listing contacts ranked by order of distance to a single set location.

FIG. 5 illustrates a list 308 of instant messaging contacts 262, within a display window 500, ranked by order of proximity to a single set location 502, in this example, 'Andrew's Eatery.' The instant messaging contact closest to the set location 502 is Harry Green 504 who is shown to be 0.1 miles away 510 from the set location 502. The next closest contact is Joe Smith 506 who is shown to be 0.2 miles 512 distant from the set location 502. The online or available instant messaging contact 508 who is farthest away from the set location 502 is Jenny Brown, who is 0.25 miles away from the set location 502.

In at least one implementation of the technology a type of transportation available to instant messaging contacts may be selectable. The technology can calculate the travel times from the location of instant messaging contacts to one or more set locations 502 using a pairwise comparison as discussed above. The device 200 can display list 308 of available contacts by order of the amount of time it would take them to travel to a set location 502. In a further implementation the technology can run a pairwise comparison calculating the shortest travel time for each contact to travel to a set location 502 comparing multiple means of travel. Thus, for example, the technology can indicate that it will take person 'A' five minutes to travel to the closest chain store in Bloomington, Ill. if she travels on foot, and that it will take person 'B' 15 minutes to get to the closest chain store in Houston, Tex. if he travels by car. In at least one embodiment, the mode of transportation is one of ambulatory, vehicular, and mass transit.

Figure 6:
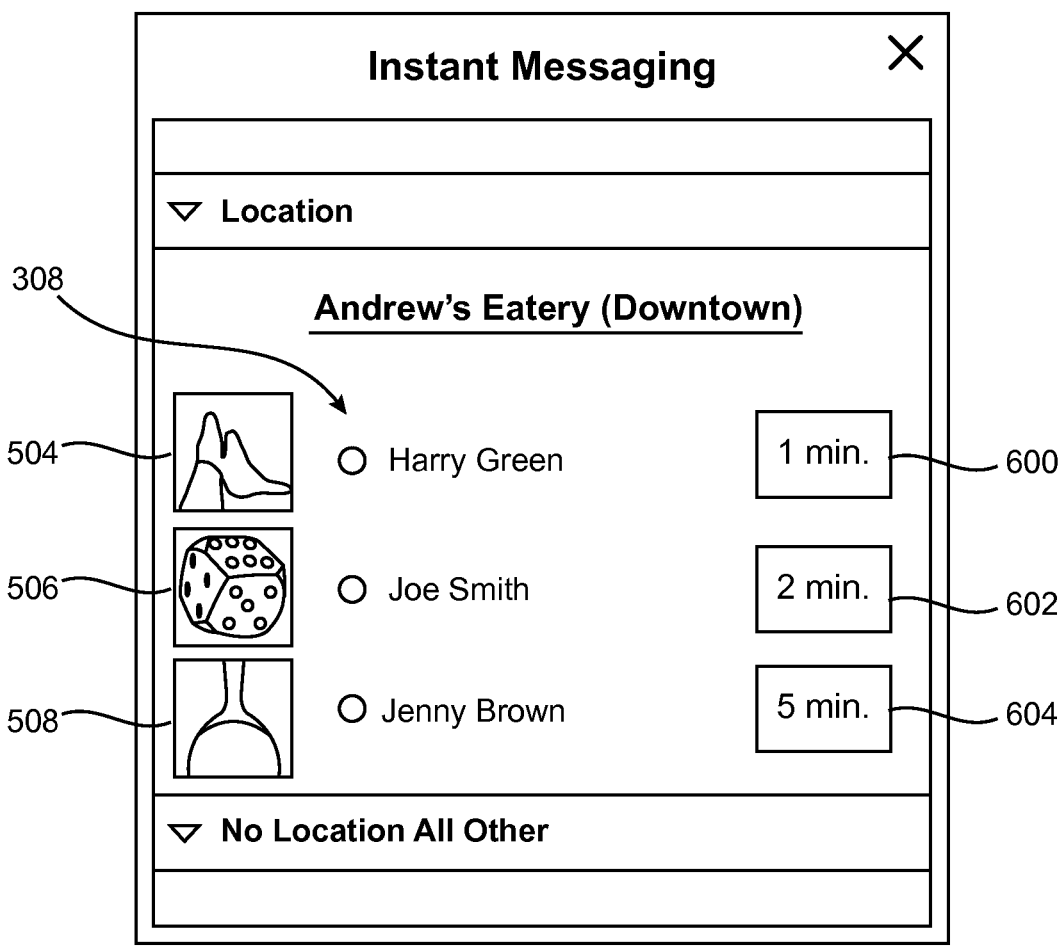
FIG. 6 illustrates an instant messaging window listing contacts ranked by order of travel time to a single set location

FIG. 6 illustrates a list 308 of instant messaging contacts, within an example display window 600, ranked by order of proximity in terms of their travel time to a single set location 502. The instant messaging contact closest to the set location 502 is Harry Green 504 who is shown to be one minute away 600 from the set location 502. The next closest contact is Joe Smith 506 who is shown to be two minutes away from the set location 502. The online or available instant messaging contact 508 who is farthest away from the set location 502 is Jenny Brown, who is five minutes away from the set location 502.

In at least one implementation, (not shown) the set location, e.g. 502 can be the location of the device itself. Thus a device user may determine which of his instant messaging contacts is closest to him (or his device), as opposed to an external location.

Figure 7:
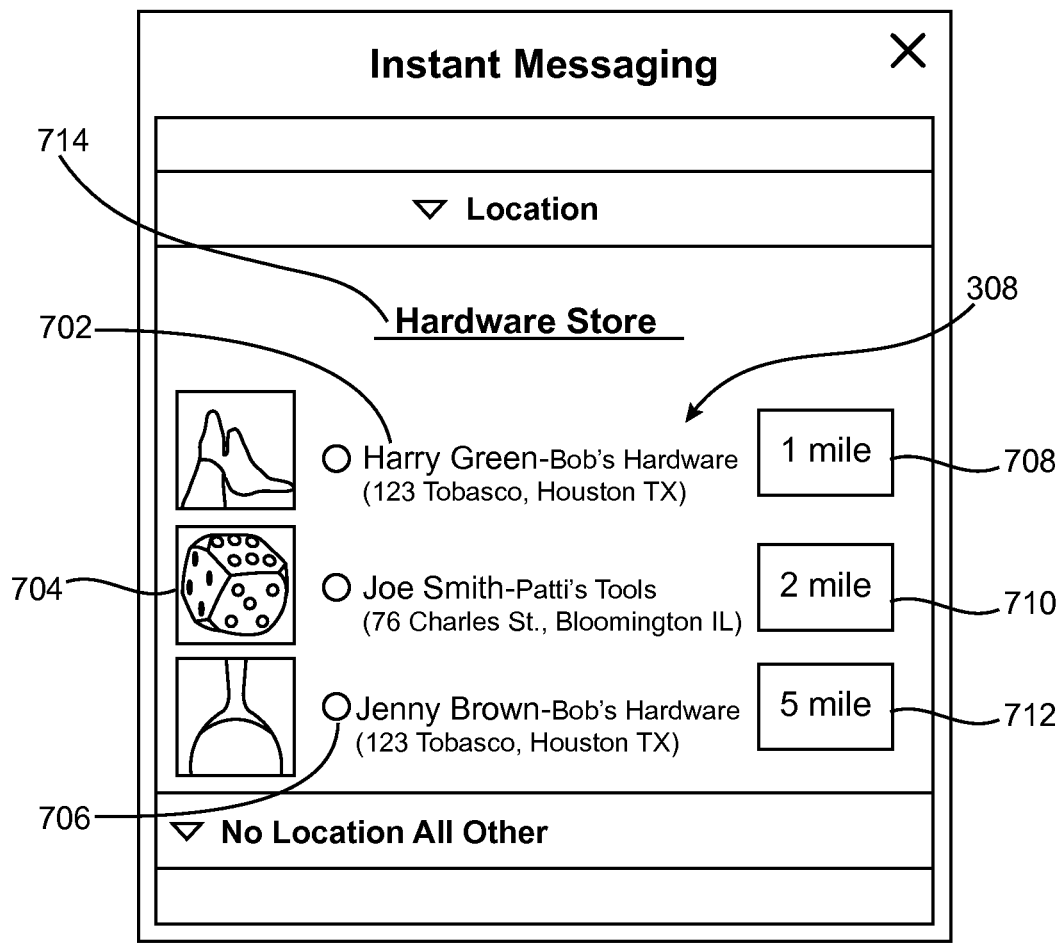
FIG. 7 illustrates an instant messaging window listing contacts by ranked by order of distance to a categorized location.

FIG. 7 illustrates a display window 700 presenting a list 308 of instant messaging contacts by order of their proximity to a set location 714 which comprises multiple locations of a certain type, as discussed above. Contact Harry Green is shown to be one mile 708 from Bob's Hardware in Houston, Tex. 702. Contact Joe Smith is shown to be two miles 710 from a different hardware store, Patti's Tools in Bloomington, Ill. 704. Contact Jenny Brown is shown to be five miles 712 Bob's Hardware in Houston.

Figure 8:
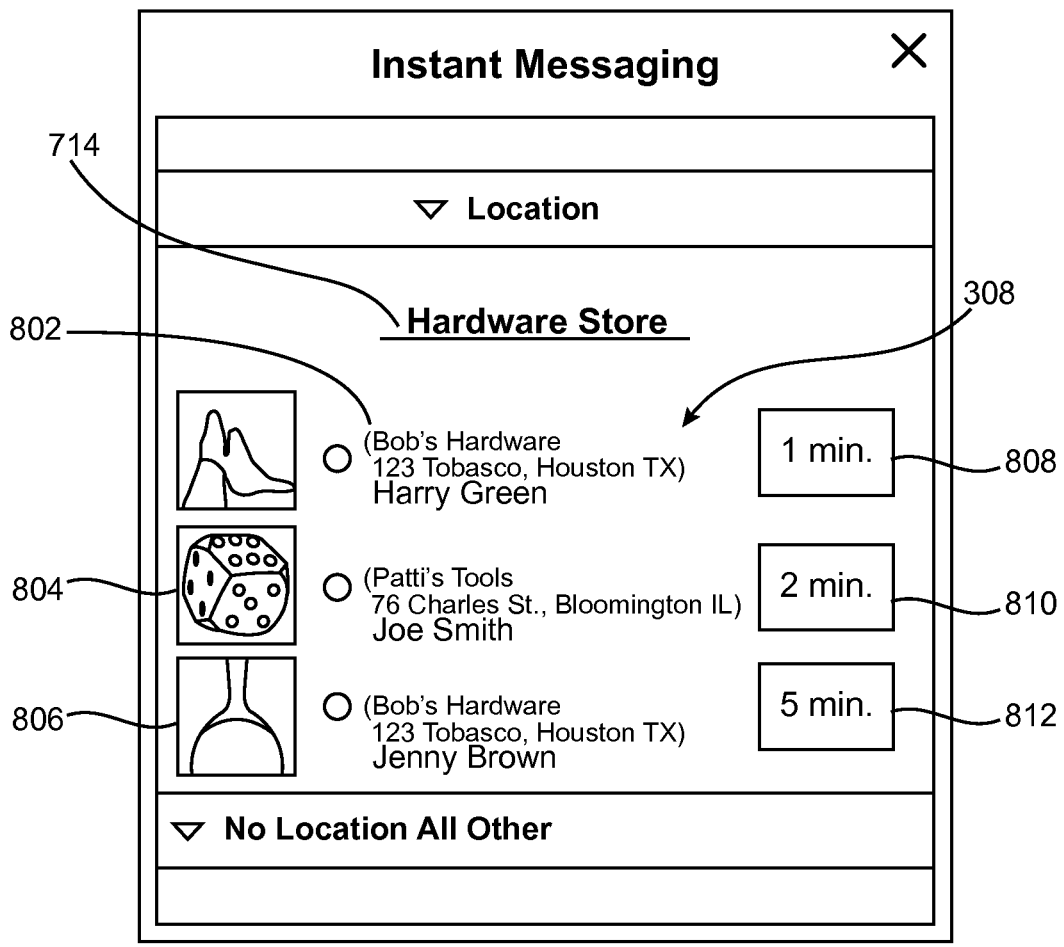
FIG. 8 illustrates an instant messaging window listing contacts by ranked by order of travel time to a categorized location.

As discussed above, the technology can sort available contacts by their proximity in travel time to multiple locations of a certain type. FIG. 8 illustrates a display window 800 of an electronic device 200 listing 308 contacts ranked by the contact's travel time to a generic location type 714. The contact with the shortest time to a hardware store is Harry Green 802 who is one minute away 808 from a hardware store in Houston. The contact with the next closest time to a hardware store is Joe Smith 802 who is two minutes 812 away from a hardware store in Bloomington, Ill. The contact who is farthest away from a hardware store is Jenny Brown 806 who is five minutes 812 travel time from the same hardware store that Harry Green is near, in Houston.

Figure 9:
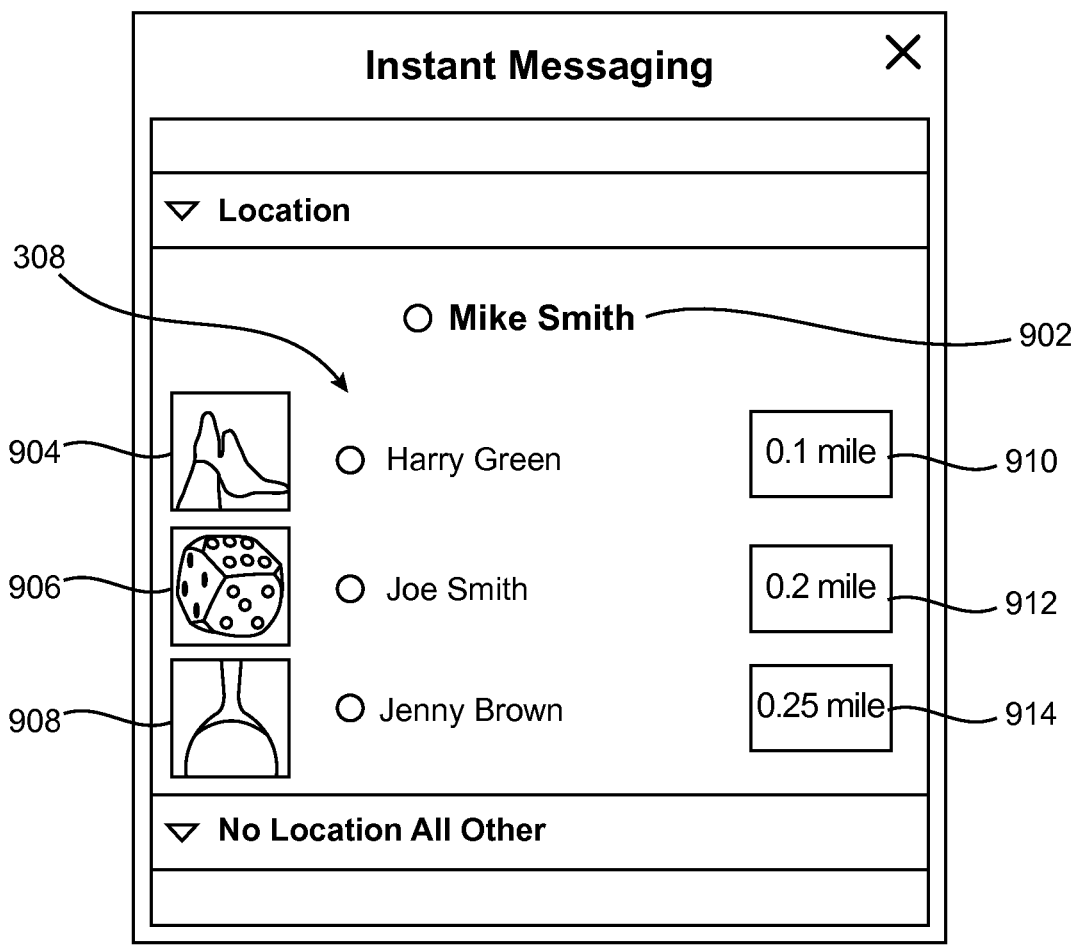
FIG. 9 illustrates an instant messaging window listing contacts ranked by order of distance to a single set location which is the location of an electronic device.

In at least one implementation, the set location, e.g. 902, can be the location of another electronic device. Thus, a device may determine which of her instant messaging contacts is closest to a particular instant messaging contact. For example, FIG. 9 illustrates a list 308 of instant messaging contacts in a display window 900 of a device 200, ranked by order of proximity to a single set location 902, 'Mike Smith.' The instant messaging contact closest to Mike Smith 902 is Harry Green 904 who is shown to be 0.1 miles away 510 from Harry Smith. The next closest contact is Joe Smith 906 who is shown to be 0.2 miles 912 distant from Mike Smith (at the set location) 902. The online or available instant messaging contact 908 who is farthest away from the location of Mike Smith 902 is Jenny Brown, who is 0.25 miles away from the set location 902.

Figure 10:
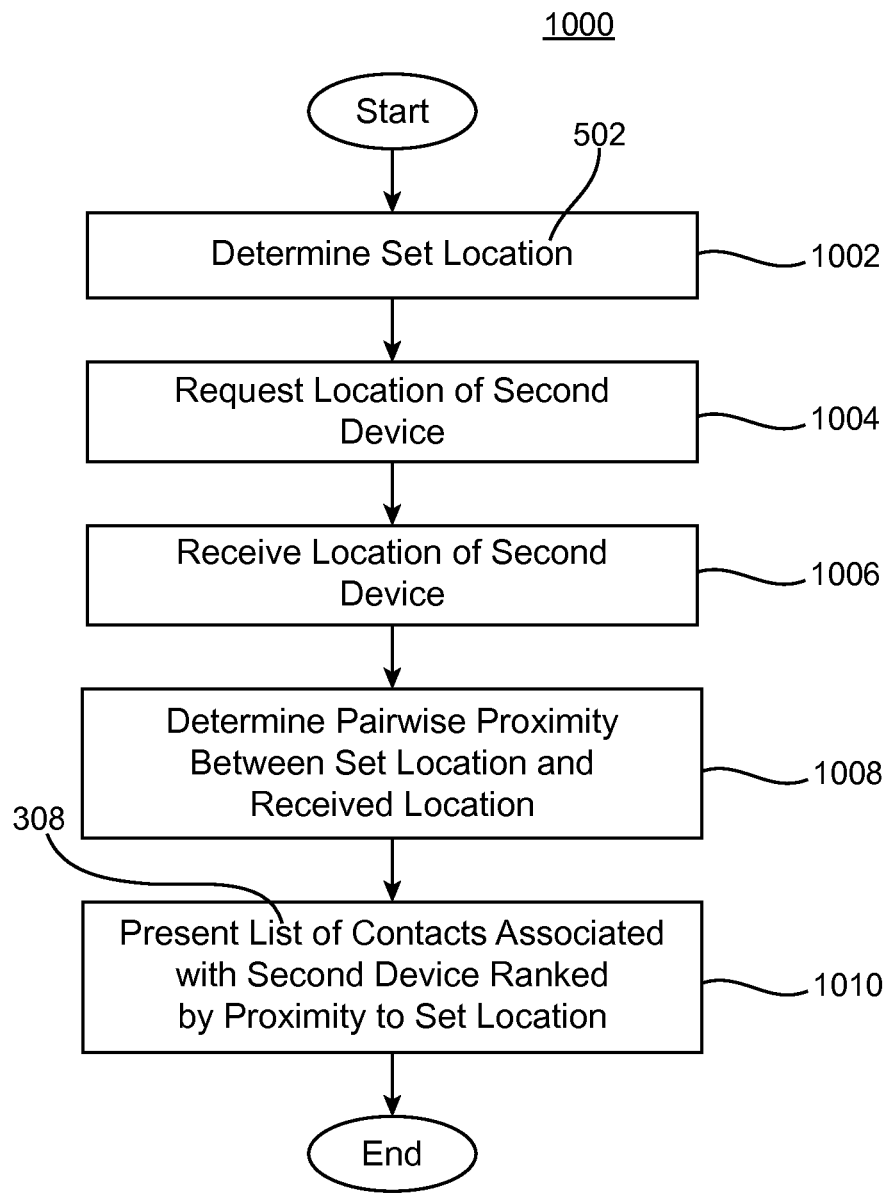
FIG. 10 illustrates an example method implementing the technology.

FIG. 10 illustrates the steps in a method for presenting instant messaging contacts of a first device. A set location 502 is determined 1002. The location of at least one second device is requested 1004, each second device associated with an instant messaging contact of the first device. The location of at least one second device is received 1006. The pairwise proximity between each at least one received location and each at least one set location 502 is determined 1008. A list 308 of at least one instant messaging contact in order of the determined pairwise proximity is presented 1010.

The technology can take the forms of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is beneficial.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™. The medium will be understood to not comprise a signal. Both processors and program code for implementing each as aspect of the technology can be centralized or distributed within one or more networks.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The foregoing examples and descriptions are merely exemplary and are not to be construed as limiting. The subject matter that is intended to be within the spirit of this disclosure is set forth in the following claims.

The invention claimed is:

1. A processor-implemented method for presenting instant messaging contacts of a first device, the method comprising:
   determining a plurality of set locations, each of the plurality of set locations being different from a location of the first device;
   requesting a location of each of a plurality of second devices, each second device associated with an instant messaging contact of the first device;
   receiving the locations of each of the plurality of second devices;
   determining pairwise proximity between the plurality of received locations and the plurality of set locations; and
   presenting a list of instant messaging contacts in order of the determined pairwise proximity between the received locations of the second devices with which each of the instant messaging contacts is associated and the plurality of set locations,
   wherein the pairwise proximity is based upon a determination of a mode of transportation available at the location of at least one of the plurality of second devices and an estimated time to the plurality of set locations using the mode of transportation available.

2. The method as recited in claim 1, wherein each of the plurality of set locations is of a same type.

3. The method as recited in claim 1, wherein pairwise proximity is based upon estimated travel time between the plurality of set locations and the received locations of the plurality of second devices.

4. The method as recited in claim 1, wherein the mode of transportation comprises at least one of ambulatory, vehicular, or mass transit.

5. The method as recited in claim 1, wherein each one of the set locations comprises at least one of product location, brand location or item location.

6. A computer program product for presenting instant messaging contacts of a first device, the computer program product comprising:
   at least one non-transitory computer readable medium; and
   at least one program module,
   stored on the at least one non-transitory computer readable medium, and
   operative, upon execution by at least one processor to:
   determine a plurality of set locations, each of the plurality of set locations being different from a location of the first device;
   request a location of each of a plurality of second devices, each of the second devices associated with an instant messaging contact of the first device;
   receive the locations of each of the plurality of second devices;
   determine pairwise proximity between the plurality of received locations and the plurality of set locations; and
   present a list of instant messaging contacts in order of the determined pairwise proximity between the received locations of the second devices with which each of the instant messaging contacts is associated and the plurality of set locations,
wherein pairwise proximity is based upon a determination of a mode of transportation available at the locations of each of the plurality of second devices and an estimated time to the plurality of set locations using the mode of transportation available.

7. The computer program product as recited in claim 6, wherein each of the plurality of set locations is of a same type.

8. The computer program product as recited in claim 6, wherein pairwise proximity is based upon estimated travel time between the plurality of set locations and the plurality of received locations of the plurality of second devices.

9. The computer program product as recited in claim 6, wherein the mode of transportation is one of ambulatory, vehicular, and mass transit.

10. The computer program product as recited in claim 6, wherein each of the set locations is determined by evaluating criteria including one of product availability, brand availability and item availability.

11. The computer program product as recited in claim 6, wherein at least one of the set locations comprises at least one location which is determined by criteria including business location.

12. An electronic device, the electronic device comprising:
a display;
at least one processor in communication with the display,
at least one computer readable medium in communication with the processor;
at least one program module, stored on the at least one medium, and operative upon execution by the processor for:
determining a plurality of set locations;
requesting a location of each of a plurality of second devices, each second device associated with an instant messaging contact of the first device;
receiving the locations of each of the plurality of second devices;
determining pairwise proximity between each of the received locations and each of the set locations; and
presenting on the display a list of the instant messaging contacts in order of the determined pairwise proximity,
wherein pairwise proximity is based upon a determination of a mode of transportation available at the plurality of second devices and an estimated time to the plurality of set locations using the mode of transportation available.

13. The device as recited in claim 12, wherein each of the plurality of set locations is of a certain same type.

14. The device as recited in claim 12, wherein pairwise proximity is based upon an estimated travel time between the plurality of set locations and the received locations of the plurality of second devices.

15. The device as recited in claim 12, wherein the mode of transportation comprises at least one of ambulatory, vehicular, or mass transit.

16. The device as recited in claim 12, wherein at least one of the set locations is determined by evaluating criteria including at least one of product availability, brand availability or item availability.

* * * * *